United States Patent
Savkar

(12) 
(10) Patent No.: US 8,176,148 B2
(45) Date of Patent: May 8, 2012

(54) METHOD AND SYSTEM FOR WIRELESS NETWORK CONFIGURATION

(75) Inventor: Pravin S. Savkar, New York, NY (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 571 days.

(21) Appl. No.: 11/756,080

(22) Filed: May 31, 2007

(65) Prior Publication Data

US 2008/0301266 A1    Dec. 4, 2008

(51) Int. Cl.
*G06F 15/177* (2006.01)

(52) U.S. Cl. ...................................................... 709/220

(58) Field of Classification Search ........... 709/220–222
See application file for complete search history.

(56) References Cited

U.S. PATENT DOCUMENTS

| | | | |
|---|---|---|---|
| 7,519,393 B2 * | 4/2009 | Bahl et al. | 455/557 |
| 7,529,543 B2 * | 5/2009 | Dale | 455/419 |
| 7,613,479 B2 * | 11/2009 | Twigg et al. | 455/558 |
| 2007/0025371 A1 * | 2/2007 | Krantz et al. | 370/401 |

* cited by examiner

*Primary Examiner* — Chirag R Patel

(57) ABSTRACT

Exemplary embodiments include methods and systems for identifying information associated with a remote user system and/or a wireless system, determining the compatibility of the remote user system and a wireless system, formulating one or more configuration plans for the remote user system and/or a wireless system and automatically implementing one or more configuration plans to establish a wireless network.

17 Claims, 4 Drawing Sheets

METHOD AND SYSTEM FOR WIRELESS NETWORK CONFIGURATION

BACKGROUND

Wireless networks have become increasingly popular for providing network access to a remote user devices. Wireless networks enable connectivity of devices to networked resources while reducing the need for traditional hard-wired network access. As a result, wireless networks provide a user with greater flexibility and convenience. For example, wireless networks allow for the mobility of a user device within the coverage range of the wireless network. However, wireless networks may be difficult to setup because of vague instructions which are usually written in technical jargon. The setup process of the wireless network may also be complicated by the sophistication of the wireless network which may include, security encryptions, network identifications and/or compatibility of plurality of hardware operating within the wireless network. Thus, wireless network access may be limited by these constraints.

BRIEF DESCRIPTION OF THE DRAWINGS

In order to facilitate a fuller understanding of the exemplary embodiments of the present inventions, reference is now made to the appended drawings. These drawings should not be construed as limiting, but are intended to be exemplary only.

DETAILED DESCRIPTION OF PREFERRED EMBODIMENTS

An exemplary embodiment provides a system and process for automatically configuring a wireless network. A network configuration system may communicate with a wireless system and a remote system through a network. The network configuration system may provide automatic configuration thereby eliminating the otherwise tedious and burdensome manual configuration process. Advantageously, the network configuration system may automatically configure a wireless network while reducing a user's frustrations and minimizing the time to properly configure the wireless network. Additionally, the network configuration system may enable a user to configure a wireless network including one or more remote user systems.

An exemplary network configuration system may configure a wireless network with minimal user interaction. For example, the network configuration system may determine one or more characteristics of a wireless system and/or a remote system for a wireless network. The network configuration system may automatically configure the wireless network based on the determined one or more characteristics of the wireless system and/or the remote system. For example, the network configuration system may determine whether the wireless system and the remote system are compatible and/or capable and accordingly configure the wireless system and/or the remote system to establish a wireless network. Therefore, the network configuration system may eliminate the tedious task of a user manually entering long security codes associated with a wireless security encryption of a wireless network. Further, the network configuration system may encourage a user to use a wireless network even though the user may not have the technical knowledge of properly configuring a wireless network. In addition, the network configuration system may facilitate a process of adding multiple remote systems to a wireless network.

Figure 1:
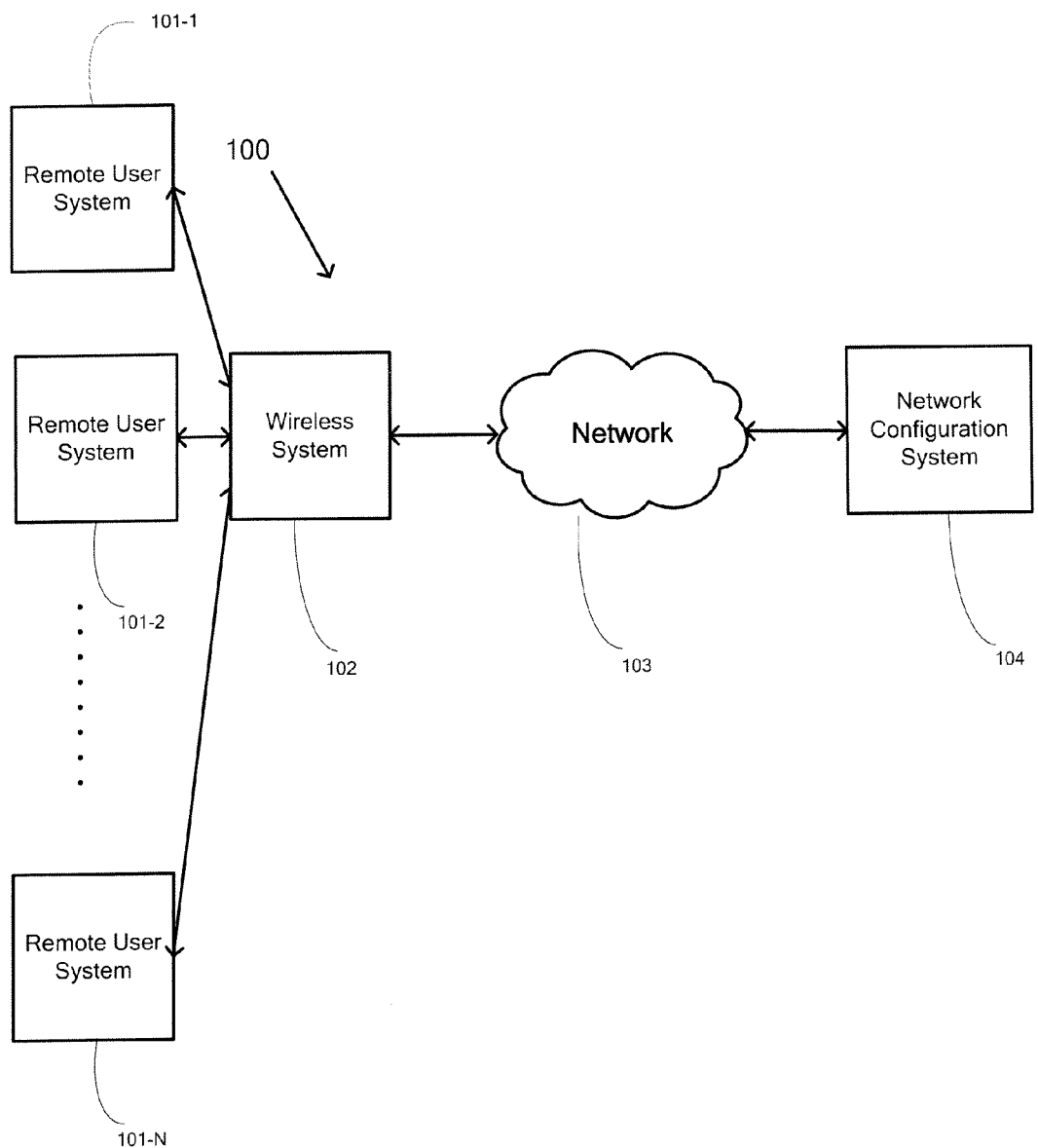
FIG. 1 depicts an exemplary system for configuring a wireless network, according to an exemplary embodiment.

FIG. 1 is an exemplary system for automatically configuring a wireless network, according to an exemplary embodiment. System 100 illustrates an exemplary system for automatically configuring a wireless network. System 100 may include a single or plurality of remote user systems 101-1, 101-2 . . . 101-N, a wireless system 102, a network 103 and a network configuration system 104. As illustrated, a plurality of remote user systems 101-1, 101-2 . . . 101-N and/or a wireless system 102 may be connected to a network configuration system 104 via a network 103. A user may operate remote user system 101-1, 101-2 . . . 101-N to communicate with network configuration system 104 via network 103. Also, wireless system 102 may communicate with configuration system 104 via network 103. Network configuration system 104 may determine one or more characteristics of a single or plurality of remote user systems 101-1, 101-2 . . . 101-N and/or wireless system 102. Accordingly, network configuration system 104 may automatically configure remote user systems 101-1, 101-2 . . . 101-N and/or wireless system 102 based on the determined one or more characteristics to establish a wireless network.

Remote user system 101-1, 101-2 . . . 101-N may be any computer device, or communications device including, e.g., a personal computer (PC), a workstation, a mobile device, a phone, a handheld PC, a personal digital assistant (PDA), a thin system, a fat system, a network appliance, an Internet browser, a paging, an alert device, a television, an interactive television, a receiver, a tuner, a high definition (HD) television, a HD receiver, a video-on-demand (VOD) system, a server, or any other device.

Wireless system 102 may be a wireless router, a wireless modem and/or any other device for providing wireless connectivity.

Network 103 may be a wireless network, a wired network or any combination of wireless, wired and/or other network. For example, network 103 may include wireless LAN, Global System for Mobile Communication (GSM), Personal Communication Service (PCS), Personal Area Network (PAN), D-AMPS, Wi-Fi, Fixed Wireless Data, satellite network, IEEE 802.11a, 802.11b, 802.15.1, 802.11n and 802.11 g and/or any other similar wireless network. In addition, network 103 may include telephone line, fiber optics, IEEE Ethernet 802.3, wide area network (WAN), local area network (LAN), and global network such as the Internet. Also, network 103 may enable, a wireless communication network, a cellular network, an Intranet, or the like, or any combination thereof. Network 103 may further include one, or any number of the exemplary types of networks mentioned above operating as a stand-alone network or in cooperation with each other.

Network configuration system 104 may be administered by an Internet service provider via the Internet. A user may access network configuration system 104 via a webpage associated with an Internet service provider. The webpage may contain an icon, a tool bar, a drop down menu, a pop-up window and/or other graphical representations that may be associated with the initiation of network configuration system 104. For example, a user may activate network configuration system 104 by clicking on a graphical representation associated with the initiation of the network configuration process. In addition, the webpage may be presented to a user on a display of remote user system 101-1, 101-2 . . . 101-N.

Also, network configuration system 104 may be administered by a mobile storage device associated with an Internet service provider. For example, the mobile storage device associated with an Internet service provider may be paper card storage, punched card, tape storage, paper tape, magnetic tape, disk storage, gramophone record, floppy disk, hard disk, ZIP disk, holographic, molecular memory or other similar storage devices. A mobile storage device associated with an Internet service provider may also include optical disc, CD-ROM, CD-R, CD-RW, DVD, DVD-R, DVD-RW, DVD+R, DVD+RW, DVD-RAM, Blu-ray, Minidisc, HVD and Phase-change Dual storage device or other similar storage devices. A mobile storage device associated with an internet service provider may further include magnetic bubble memory, magnetic drum, core memory, core rope memory, thin film memory, twistor memory, flash memory, memory card, semiconductor memory, solid state semiconductor memory or other similar storage devices.

Network configuration system 104 may automatically configure a wireless network as described above. Also, network configuration system 104 may enable a user to customize and/or configure a wireless network manually by inputting and/or setting characteristics associated with remote user system 101-1, 101-2 . . . 101-N and/or wireless system 102.

Figure 2:
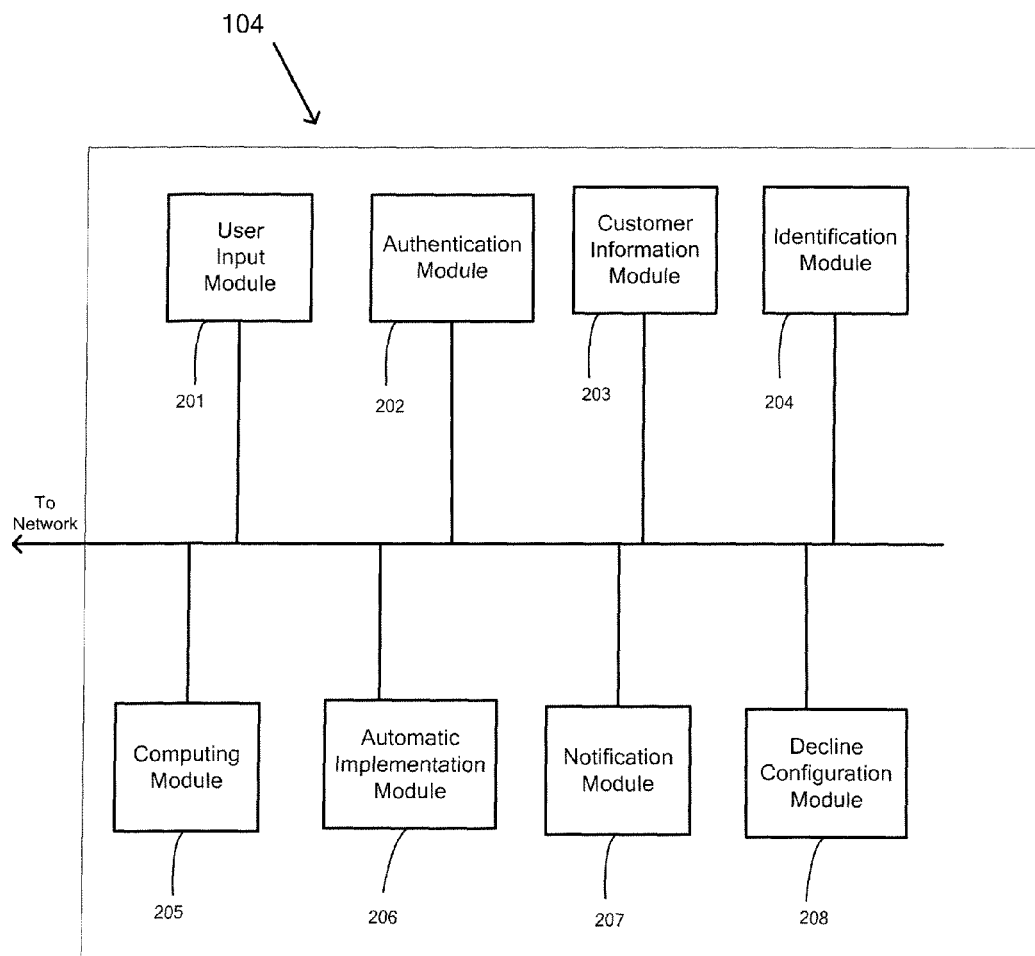
FIG. 2 depicts an exemplary automatic wireless network configuration system for a system of configuring a wireless network, according to an exemplary embodiment.

FIG. 2 depicts a network configuration system 104, according to an exemplary embodiment. Network configuration system 104 may include a user input module 201, an authentication module 202, a customer information module 203, an identification module 204, a computing module 205, an automatic implementation module 206, a notification module 207 and a decline configuration module 208. Modules of network configuration system 104 may be part of a single system and interconnected via common bus line as illustrated in FIG. 2, or the modules may be part of separate systems either physically or logically separated, wherein each module performs a particular function.

As shown in FIG. 2, network configuration system 104 may include user input module 201 which may receive user input information via network 103. The user input information may be transferred to authentication module 202, where the user input information may be compared with an authentication information associated with a user that may be stored in authentication module 202 and/or customer information module 203. Also, a user may be authenticated by network configuration system 104 during initial setting.

Once authenticated by authentication module 202 and/or an initial set up of Internet service, identification module 204 may identify and/or extract hardware and/or software information associated with remote user system 101-1, 101-2 . . . 101-N and/or wireless system 102. Hardware information associated with remote user system 101-1, 101-2 . . . 101-N may include wireless card, processor, RAM, ROM, bus connections and/or other devices for operating a wireless network. Software information associated with remote user system 101-1, 101-2 . . . 101-N may include operating system, wireless card driver software and/or other software for configuring a wireless network. Hardware information associated with wireless system 102 which may be identified and/or extracted by identification module 204 include modem, router, speed of transmission and/or other information for configuring a wireless network. Also, software information associated with wireless system 102 which may be identified and/or extracted by identification module 204 include network identification, security encryption, security keys, encryption protocols and/or other information for configuring a wireless network. Information identified and/or extracted from remote user system 101-1, 101-2 . . . 101-N and/or wireless system 102 may be stored in identification module 204 and/or transferred to computing module 205.

Based on information associated with remote user system 101-1, 101-2 . . . 101-N and/or wireless system 102 received from identification module 204, computing module 205 may determine the compatibility and/or capability of remote user system 101-1, 101-2 . . . 101-N and wireless system 102. The determination may be performed by an algorithm associated with computing module 205, where the algorithm may compare the information associated with remote user system 101-1, 101-2 . . . 101-N with the information associated with wireless system 102. For example, the algorithm may perform a comparison function of the information associated with remote user system 101-1, 101-2 . . . 101-N and/or wireless system 102 with a data table. The data table may contain information associated with the compatibility and/or the capability of remote user system 101-1, 101-2 . . . 101-N and/or wireless system 102. The information associated with remote user system 101-1, 101-2 . . . 101-N and/or wireless system 102 may match information contained in the data table. As a result, computing module 205 may determine that remote user system 101-1, 101-2 . . . 101-N and/or wireless system 102 may be compatible and/or capable of establishing a wireless network. Also, the information associated with remote user system 101-1, 101-2 . . . 101-N and/or wireless system 102 may not match information contained in the data table. Thus, computing module 205 may determine that remote user system 101-1, 101-2 . . . 101-N and/or wireless system may not be compatible and/or capable of establishing a wireless network.

Upon determining that remote user system 101-1, 101-2 . . . 101-N and/or wireless system 102 may be compatible and/or capable of establishing a wireless network, computing module 205 may proceed to formulate one or more configuration plans to automatically configure remote user system 101-1, 101-2 . . . 101-N and/or wireless system 102 to establish a wireless network. Computing module 205 may formulate one or more configuration plan to include instructions to configure remote user system 101-1, 101-2 . . . 101-N and/or wireless system 102 in accordance with information associated with remote user system 101-1, 101-2 . . . 101-N and/or wireless system 102. Also, one or more configuration plan may be predetermined in accordance to various information associated with remote user system 101-1, 101-2 . . . 101-N and/or wireless system 102. Therefore, computing module 205 may transfer one or more configuration plans to automatic implementation module 206.

Automatic implementation module 206 may implement one or more configuration plans received from computing module 205 by automatically configuring remote user system 101-1, 101-2 . . . 101-N and/or wireless system 102 to establish a wireless network. Automatic implementation module 206 may also update the user account information stored in customer information module 203, and/or notify the service provider of a user's establishment of a wireless network.

Also, computing module 205 may determine that remote user system 101-1, 101-2 . . . 101-N and wireless system 102 may not be compatible and/or capable of establishing a wireless network. In response, notification module 207 may notify a user of the determination. Notification module 207 may include, hardware, software, or a combination of hardware and software operable to notify a user during a network configuration process. Notification module 207 may notify a user by sending user system 101-1, 101-2 . . . 101-N or other display devices utilized by the user, the progress and/or the determination of network configuration system 104.

A user may also decline network configuration offered by an Internet service provider and manually configure a wireless network. Decline configuration module 208 may record a user's decline of network configuration offered by the Internet service provider. Decline configuration module 208 may also prompt the user for a reason for declining the network configuration. This response may be stored in customer information module 203.

A customer information module 203 may store information associated with a user and may allow other modules in network configuration system 104 to obtain information associated with a user. Customer information module 203 may also store, a user's name, a user's account/unique number, a user's telephone number, a user's cellular telephone number, and a user's e-mail address. Also, customer information module 203 may store a plurality of user's related account and service information in a database. The user's account information may include account identification, billing address, payment information, existing products and/or services associated with the user and any information associated with the user account.

Figure 3:
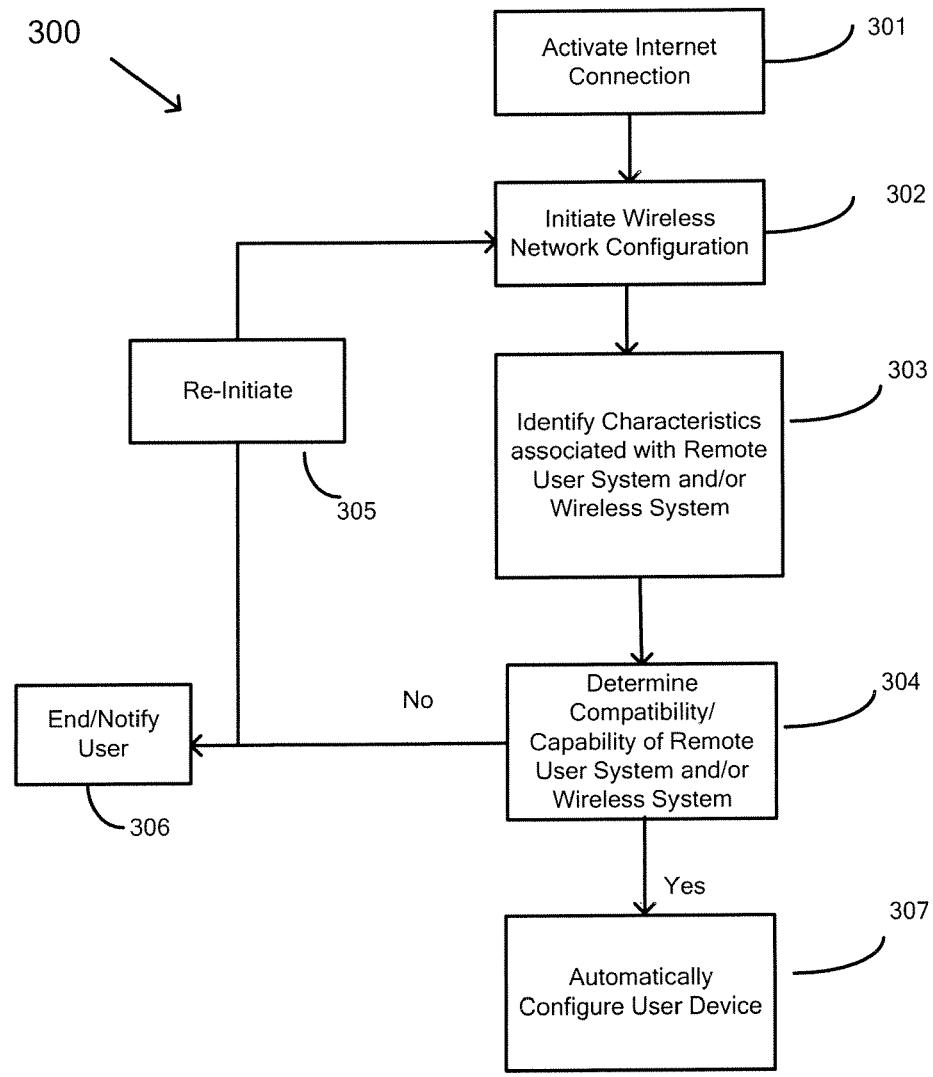
FIG. 3 is an exemplary flowchart illustrating a process of configuring a wireless network, according to an exemplary embodiment.

FIG. 3 depicts a flow chart 300 which illustrates an exemplary method of automatically configuring a wireless network. At block 301, a user may activate an Internet connection. At block 302, the user may initiate wireless network configuration. At block 303, one or more characteristics associated with a remote user system and/or a wireless system may be identified. At block 304, the compatibility and/or the capability of the remote user system and/or wireless system to establish a wireless network may be determined. If the remote user system and/or the wireless system are determined to be compatible and/or capable of establishing a wireless network, the remote user system and/or the wireless system may be automatically configured at block 307 to establish a wireless network. Also, a user may be notified that the remote user system and/or the wireless system may not be compatible and/or capable of establishing a wireless network at block 306. Further, a user may select to re-initiate the network configuration process at block 305.

At block 301, a new user may establish an Internet connection with an Internet service provider by setting up hardware and/or software, which may include, wireless router, wireless modem, installation software, etc. An existing user may activate preexisting Internet connection provided by an Internet service provider.

At block 302, a user may initiate a wireless network configuration. By establishing an Internet connection at block 301, a user may be automatically authenticated into a network configuration system to initiate the wireless network configuration process.

An existing user may gain access to a network configuration system by transmitting user identification information to the network configuration system. User identification information may be inputted into a remote user system utilizing an interface associated with the remote user system. Examples of inputting user identification information may include manual input (e.g., typing into a keyboard or keypad, etc.), voice input, finger printing, retina scan and/or any other method for inputting identification information.

User identification information may be securely transmitted over a network to the network configuration system. The user identification information may be encrypted, ciphertext and decrypted according to various security protocols to protect the user identification information transmitted via the network.

User identification information may be received by a user input module. For example, user input module may transfer the user identification information to an authentication module. Also, the user input module may process the user identification information to decipher and/or decrypt the user identification information before transmission to the authentication module.

The authentication module may receive user identification information, and may attempt to authenticate the user using the user identification information and/or other information that may be stored in a customer information module. If the user identification information inputted by a user matches information stored in the customer information module, the user may proceed in the wireless network configuration process.

In addition, the user identification information inputted by a user may not match information stored in the customer information module. When the information does not match, the user may not be authenticated and may not be allowed to proceed in the wireless network configuring process. If the authentication process fails, the user may be notified of failure and may be asked to reenter user identification information. The user may reenter user identification information and may attempt to re-authenticate, as explained above.

The authentication module may also limit the number of times a user may try to authenticate into the network configuration system. Also, the authentication module may allow a user unlimited number of tries to authenticate into the network configuration system, until either the user authenticates into the network configuration system or the user stops attempting. For example, if a user cannot authenticate, or the user exceeds the number of attempts permitted, the wireless network configuration process may end.

At block 303, an identification module may identify and/or extract one or more characteristics associated with a remote user system and/or a wireless system. For example, hardware and/or software characteristics associated with the remote user system may be identified and/or extracted. Hardware characteristics associated with the remote user system may include wireless card, processor, RAM, ROM, bus connections and/or other device characteristics for configuring a wireless network. Software characteristics associated with the remote user system may include characteristics associated with an operating system, wireless card driver characteristics and/or other software characteristics for configuring a wireless network. Also, hardware and/or software characteristics associated with a wireless system may be identified and/or extracted. Hardware characteristics associated with the wireless system may include type of wireless system, speed of transmission, and/or other characteristics for configuring a wireless network. Software characteristics associated with the wireless system may include security encryption, security keys, encryption protocols and/or other software characteristics for configuring a wireless network.

At block 304, one or more characteristics associated with a remote user system and/or a wireless system may be identified for a compatibility and/or a capability determination. For example, one or more characteristics associated with the remote user system may be compared and/or contrasted with one or more characteristics associated with the wireless system to determine the compatibility and/or the capability of the remote user system and the wireless system to establish a wireless network, as described above. Moreover, one or more plans of configuration may be formulated for the remote user system and/or the wireless system in order to establish a wireless network.

At block 305, a user may re-initiate the wireless network configuration process after the determination of incompatibility and/or incapability of the remote user system and/or the wireless system at block 304. Also, a user may be prompted with the reason for incompatibility and/or incapability of the remote user system and/or the wireless system. In addition, a user may manually modify the remote user system and/or the wireless system in order to correct the incompatibility and/or incapability and re-initiate the wireless network configuration process.

At block 306, a user may be prompted with the reason for incompatibility and/or incapability and the user may elect to end the wireless network configuration process. For example, a user may elect to end the wireless network configuration process offered by an Internet service provider, the user may be asked to identify reasons for declining the wireless network configuration process by a decline configuration module. The user's reason for declining wireless network configuration process may be stored in a customer information module.

At block 307, the remote user system and/or the wireless system may be automatically configured after the compatibility and/or the capability determination, according to one or more configuration plans formulated. Also, a user may select one or more configuration plans and an automatic implementation module may configure the remote user system and/or the wireless system to establish a wireless network. The automatic implementation module may configure the remote user system and/or the wireless system according to one or more configuration plans selected by the user. Furthermore, the implementation of the one or more configuration plan may be recorded and the service provider may be notified.

Figure 4:
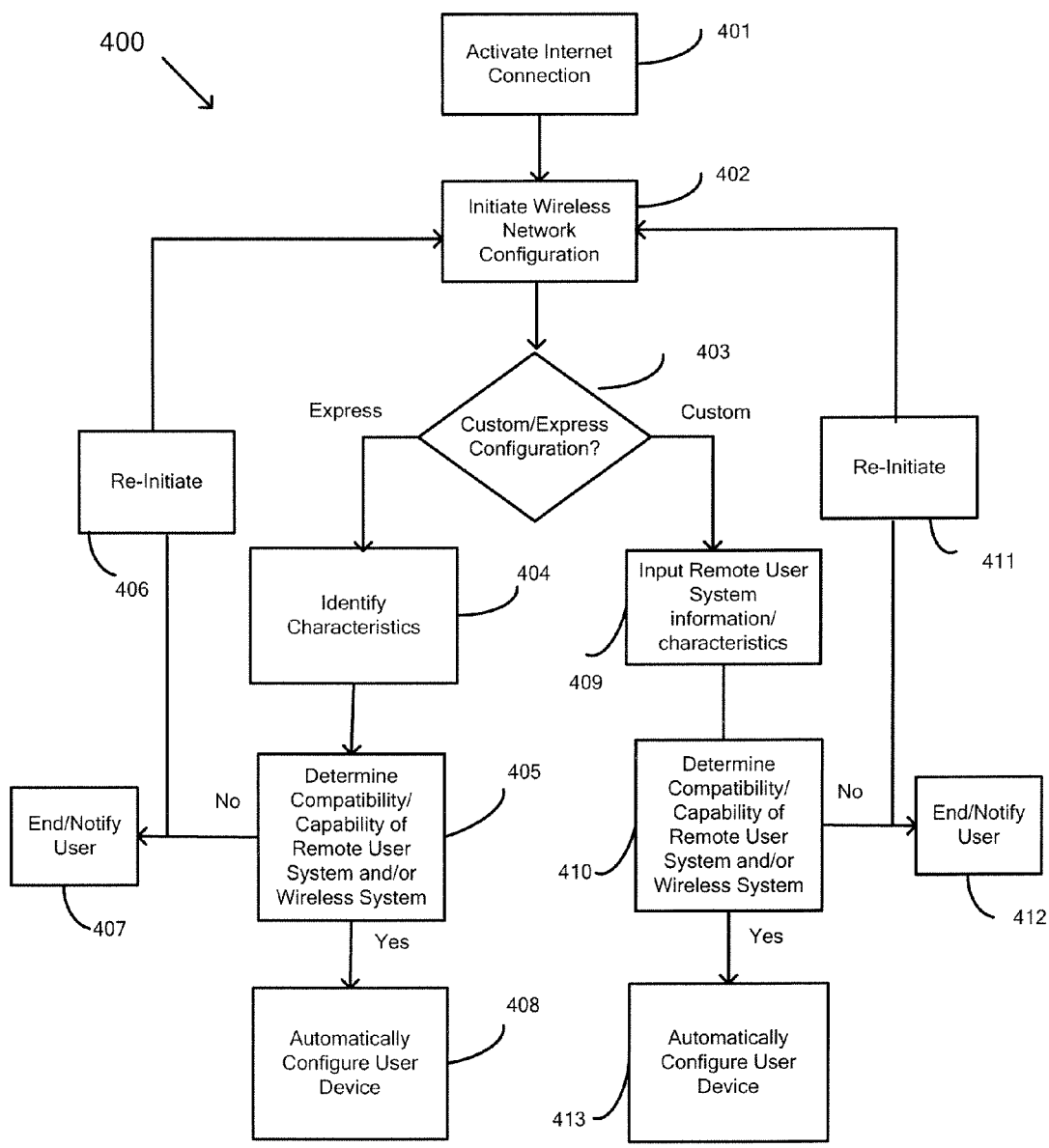
FIG. 4 is an exemplary flowchart illustrating a process of configuring a wireless network, according to an exemplary embodiment.

FIG. 4, depicts an exemplary flowchart illustrating a method for a wireless network configuration process 400, according to an exemplary embodiment. At block 401, a user may activate an Internet connection. At block 402, the user may initiate wireless network configuration. At block 403, the user may be presented with an option of custom and/or express configuration. For example, a user may select express wireless network configuration and at block 404, one or more characteristics associated with a remote user system and/or a wireless system may be identified. At block 405, the compatibility and/or the capability of the remote user system and/or the wireless system to establish a wireless network may be determined. If the remote user system and/or the wireless system are determined to be compatible and/or capable of establishing a wireless network, the remote user system and/or the wireless system may be automatically configured at block 408. Also, a user may be notified that the remote user system and/or the wireless system may not be compatible and/or capable of establishing a wireless network at block 407. Further, a user may select to re-initiate the wireless network configuration process at block 406.

Also, a user may select custom wireless network configuration and at block 409, the user may input one or more characteristics associated with the remote user system and/or the wireless system. At block 410, the compatibility and/or the capability of the remote user system and/or the wireless system to establish a wireless network may be determined. If the remote user system and/or the wireless system are determined to be compatible and/or capable of establishing a wireless network, the remote user system and/or the wireless system may be automatically configured at block 413. Also, a user may be notified that the remote user system and/or the wireless system may not be compatible and/or capable of establishing a wireless network at block 412. Further, a user may select to re-initiate the wireless network configuration process at block 411.

At block 401, a new user may establish an Internet connection with an Internet service provider by setting up hardware and/or software, which may include, wireless router, wireless modem, installation software, etc. An existing user may activate preexisting Internet connection provided by an Internet service provider.

At block 402, a user may initiate a wireless network configuration. By establishing an Internet connection at block 301, a user may be automatically authenticated into a network configuration system to initiate the wireless network configuration process.

An existing user may gain access to a network configuration system by transmitting user identification information to the network configuration system. User identification information may be inputted into a remote user system utilizing an interface associated with the remote user system. Examples of inputting user identification information may include manual input (e.g., typing into a keyboard or keypad, etc.), voice input, finger printing, retina scan and/or any other method for inputting identification information.

User identification information may be securely transmitted over a network to the network configuration system. The user identification information may be encrypted, ciphertext and decrypted according to various security protocols to protect the user identification information transmitted via the network.

User identification information may be received by a user input module. For example, user input module may transfer the user identification information to an authentication module. Also, the user input module may process the user identification information to decipher and/or decrypt the user identification information before transmission to the authentication module.

The authentication module may receive user identification information, and may attempt to authenticate the user using the user identification information and/or other information that may be stored in a customer information module. If the user identification information inputted by a user matches information stored in the customer information module, the user may proceed in the wireless network configuration process.

In addition, the user identification information inputted by a user may not match information stored in the customer information module. When the information does not match, the user may not be authenticated and may not be allowed to proceed in the wireless network configuring process. If the authentication process fails, the user may be notified of failure and may be asked to reenter the user identification information. The user may reenter user identification information and may attempt to re-authenticate, as explained above.

The authentication module may also limit the number of times a user may try to authenticate into the network configuration system. Also, the authentication module may allow a user unlimited number of tries to authenticate into the network configuration system, until either the user authenticates into the network configuration system or the user stops attempting. For example, if a user cannot authenticate, or the user exceeds the number of attempts permitted, the wireless network configuration process may end.

At block 403, a user may select express or custom network configuration. For example, a user may select express network configuration which may automatically configure a wireless network without a user's manual input. Also, a user may select custom configuration which may be implemented with the user's manual input.

At block 404, an identification module may identify and/or extract one or more characteristics associated with a remote user system and/or a wireless system. For example, hardware and/or software characteristics associated with the remote user system may be identified and/or extracted. Hardware characteristics associated with the remote user system may include wireless card, processor, RAM, ROM, bus connections and/or other device characteristics for configuring a wireless network. Software characteristics associated with the remote user system may include characteristics associated with an operating system, wireless card driver characteristics and/or other software characteristics for configuring a wireless network. Also, hardware and/or software characteristics associated with a wireless system may be identified and/or extracted. Hardware characteristics associated with the wireless system may include type of wireless system, speed of transmission, and/or other characteristics for configuring a wireless network. Software characteristics associated with the wireless system may include security encryption, security keys, encryption protocols and/or other software characteristics for configuring a wireless network.

At block 405, one or more characteristics associated with a remote user system and/or a wireless system may be identified for a compatibility and/or a capability determination. For example, one or more characteristics associated with the remote user system may be compared and/or contrasted with one or more characteristics associated with the wireless system to determine the compatibility and/or the capability of the remote user system and the wireless system to establish a wireless network, as described above. Moreover, one or more plans of configuration may be formulated for the remote user system and/or the wireless system in order to establish a wireless network.

At block 406, a user may re-initiate the wireless network configuration process after the determination of incompatibility and/or incapability of the remote user system and/or the wireless system at block 304. Also, a user may be prompted with the reason for incompatibility and/or incapability of the remote user system and/or the wireless system. In addition, a user may manually modify the remote user system and/or the wireless system in order to correct the incompatibility and/or incapability and re-initiate the wireless network configuration process.

At block 407, a user may be prompted with the reason for incompatibility and/or incapability and the user may elect to end the wireless network configuration process. For example, a user may elect to end the wireless network configuration process offered by an Internet service provider, the user may be asked to identify reasons for declining the wireless network configuration process by a decline configuration module. The user's reason for declining wireless network configuration process may be stored in a customer information module.

At block 408, the remote user system and/or the wireless system may be automatically configured after the compatibility and/or the capability determination, according to one or more configuration plans formulated. Also, a user may select one or more configuration plans and an automatic implementation module may configure the remote user system and/or the wireless system to establish a wireless network. The automatic implementation module may configure the remote user system and/or the wireless system according to one or more configuration plans selected by the user. Furthermore, the implementation of the one or more configuration plan may be recorded and the service provider may be notified.

At block 409, a user may select custom wireless network configuration and a user may input one or more characteristics associated with a remote user system and/or a wireless system via a user input module. Hardware characteristics associated with the remote user system may include wireless card, processor, RAM, ROM, bus connections and/or other device characteristics for configuring a wireless network. Software characteristics associated with the remote user system may include characteristics associated with an operating system, wireless card driver characteristics and/or other software characteristics for configuring a wireless network. Also, hardware and/or software characteristics associated with a wireless system may be identified and/or extracted. Hardware characteristics associated with the wireless system may include type of wireless system, speed of transmission, and/or other characteristics for configuring a wireless network. Software characteristics associated with the wireless system may include security encryption, security keys, encryption protocols and/or other software characteristics for configuring a wireless network.

At block 410, one or more characteristics associated with a remote user system and/or a wireless system may be identified for a compatibility and/or a capability determination. For example, one or more characteristics associated with the remote user system may be compared and/or contrasted with one or more characteristics associated with the wireless system to determine the compatibility and/or the capability of the remote user system and the wireless system to establish a wireless network, as described above. Moreover, one or more plans of configuration may be formulated for the remote user system and/or the wireless system in order to establish a wireless network.

At block 411, a user may re-initiate the wireless network configuration process after the determination of incompatibility and/or incapability of the remote user system and/or the wireless system at block 304. Also, a user may be prompted with the reason for incompatibility and/or incapability of the remote user system and/or the wireless system. In addition, a user may manually modify the remote user system and/or the wireless system in order to correct the incompatibility and/or incapability and re-initiate the wireless network configuration process.

At block 412, a user may be prompted with the reason for incompatibility and/or incapability and the user may elect to end the wireless network configuration process. For example, a user may elect to end the wireless network configuration process offered by an Internet service provider, the user may be asked to identify reasons for declining the wireless network configuration process by a decline configuration module. The user's reason for declining wireless network configuration process may be stored in a customer information module.

At block 413, the remote user system and/or the wireless system may be automatically configured after the compatibility and/or the capability determination, according to one or more configuration plans formulated. Also, a user may select one or more configuration plans and an automatic implementation module may configure the remote user system and/or the wireless system to establish a wireless network. The automatic implementation module may configure the remote user system and/or the wireless system according to one or more configuration plans selected by the user. Furthermore, the implementation of the one or more configuration plan may be recorded and the service provider may be notified.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The invention claimed is:

1. A method, comprising:
    establishing a network connection with a remote user system via a wireless system;
    identifying one or more characteristics associated with the remote user system;
    identifying one or more characteristics associated with the wireless system, wherein the one or more characteristics associated with the wireless system comprise one or more hardware characteristics and one or more software characteristics associated with the wireless system;
    determining a capability of the remote user system based at least in part on the one or more characteristics associated with the remote user system;
    determining a capability of the wireless system based at least in part on the one or more characteristics associated with the wireless system;
    formulating one or more configuring plans based at least in part on a comparison of the capability of the remote user system with the capability of the wireless system; and
    automatically configuring the remote user system and the wireless system according to the one or more configuration plans to establish a wireless network between the remote user system and the wireless system.

2. The method of claim 1, wherein identifying one or more characteristics associated with the remote user system comprises identifying one or more hardware characteristics and one or more software characteristics associated with the remote user system.

3. The method of claim 2, wherein the one or more hardware characteristics associated with the remote user system comprises one or more of wireless card, processor, RAM, ROM and bus connections.

4. The method of claim 2, wherein the one or more software characteristics associated with the remote user system comprises one or more of software operating system and wireless card driver software.

5. The method of claim 1, wherein identifying one or more characteristics associated with the remote user system comprises manually inputting the one or more characteristics associated with the remote user system.

6. The method of claim 1, wherein comparison of the capability of the remote user system with the capability of the wireless system comprises determining compatibility of the remote user system and the wireless system based at least in part on the one or more characteristics associated with the remote user system and the one or more characteristics associated with the wireless system.

7. The method of claim 1, wherein the one or more hardware characteristics associated with the wireless system comprises one or more of wireless router characteristics, and modem characteristics.

8. The method of claim 1, wherein the one or more software characteristics associated with the wireless system comprises one or more of network identification, security encryption, security keys and encryption protocols.

9. The method of claim 1, wherein identifying one or more characteristics associated with the wireless system comprises manually inputting the one or more characteristics associated with the wireless system.

10. A system, comprising:
    a remote user system to establish a network connection via a wireless system;
    an identification module to identify one or more characteristics associated with the remote user system and identify one or more characteristics associated with the wireless system, wherein the one or more characteristics associated with the wireless system comprise one or more hardware characteristics and one or more software characteristics associated with the wireless system;
    a computing module to determine a capability of the remote user system based at least in part on the one or more characteristics associated with the remote user system and a capability of the wireless system based at least in part on the one or more characteristics associated with the wireless system, the computer module to further formulate one or more configuration plans based at least in part on a comparison of the capability of the remote user system with the capability of the wireless system; and
    an automatic implementation module to automatically configure the remote user system and the wireless system according to the one or more configuration plans to establish a wireless network between the remote user system and the wireless system.

11. The system of claim 10, wherein the identification module to identify one or more characteristics associated with the remote user system comprises identify one or more hardware characteristics and one or more software characteristics associated with the remote user system.

12. The system of claim 11, wherein the one or more hardware characteristics associated with the remote user system comprises one or more of wireless card, processor, RAM, ROM and bus connections.

13. The system of claim 11, wherein the one or more software characteristics associated with the remote user system comprises one or more of software operating system and wireless card driver software.

14. The system of claim 10, wherein comparison of the capability of the remote user system with the capability of the wireless system comprises the computing module to determine compatibility of the remote user system and the wireless system based at least in part on the one or more characteristics associated with the remote user system and the one or more characteristics associated with the wireless system.

15. The system of claim 10, wherein the one or more hardware charaeristics associated with the wireless system comprises one or more of wireless router characteristics, and modem characteristics.

16. The system of claim 10, wherein the one or more software characteristics associated with the wireless system comprises one or more of network identification, security encryption, security keys and encryption protocols.

17. A non-transitory computer readable media comprising code to perform the acts of the method of claim 1.

* * * * *